(12) United States Patent
Li et al.

(10) Patent No.: US 9,413,806 B2
(45) Date of Patent: Aug. 9, 2016

(54) ADAPTIVE BIT RATE PROXY

(71) Applicant: Broadcom Corporation, Irvine, CA (US)

(72) Inventors: Yong Li, San Diego, CA (US); Xuemin Chen, Rancho Santa Fe, CA (US); Alexander Garland Macinnis, Los Altos, CA (US); Brian Francis Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 228 days.

(21) Appl. No.: 14/042,651

(22) Filed: Sep. 30, 2013

(65) Prior Publication Data

US 2014/0351385 A1    Nov. 27, 2014

Related U.S. Application Data

(60) Provisional application No. 61/827,510, filed on May 24, 2013.

(51) Int. Cl.
| | |
|---|---|
| *G06F 15/173* | (2006.01) |
| *H04L 29/08* | (2006.01) |
| *G06Q 30/02* | (2012.01) |
| *H04L 29/06* | (2006.01) |
| *H04N 21/2225* | (2011.01) |
| *H04N 21/2343* | (2011.01) |
| *H04N 21/24* | (2011.01) |
| *H04N 21/61* | (2011.01) |
| *H04N 21/845* | (2011.01) |

(52) U.S. Cl.
CPC ............ *H04L 67/02* (2013.01); *G06Q 30/0242* (2013.01); *H04L 65/601* (2013.01); *H04L 65/602* (2013.01); *H04N 21/2225* (2013.01); *H04N 21/23439* (2013.01); *H04N 21/2402* (2013.01); *H04N 21/6125* (2013.01); *H04N 21/8456* (2013.01); *H04L 65/4084* (2013.01)

(58) Field of Classification Search
USPC ................................................. 709/223, 219
See application file for complete search history.

(56) References Cited

U.S. PATENT DOCUMENTS

| | | | | |
|---|---|---|---|---|
| 8,676,952 B2* | 3/2014 | Reynolds | ................ | H04L 67/02 709/223 |
| 2007/0162568 A1* | 7/2007 | Gupta | ................ | G06Q 30/0242 709/219 |
| 2013/0067052 A1* | 3/2013 | Reynolds | ................ | H04L 67/02 709/223 |

* cited by examiner

*Primary Examiner* — Kyung H Shin

(74) *Attorney, Agent, or Firm* — McDermott Will & Emery LLP (57) ABSTRACT

A device and method for providing an adaptive bit rate (ABR) proxy is disclosed. An ABR proxy determines an optimal data format to receive content segments for an audio/video (AV) content item from a source ABR server, and generates, based on that format and/or current network conditions, one or more local AV representations for providing content segments for the AV content item to locally connected devices. A local client device selects a local AV representation, and the ABR proxy provides the content segments for the AV content item to the local device in accordance with the selected local AV representation.

27 Claims, 5 Drawing Sheets

ADAPTIVE BIT RATE PROXY

CROSS-REFERENCE TO RELATED APPLICATIONS

The present application claims the benefit of priority under 35 U.S.C. §119 from U.S. Provisional Patent Application Ser. No. 61/827,510 entitled "Adaptive Bit Rate Proxy," filed on May 24, 2013, the disclosure of which is hereby incorporated by reference in its entirety for all purposes.

BACKGROUND

An adaptive bit rate (ABR) server in a content delivery network (CDN) advertises an audio/video (AV) stream at different bit rates. A set top box (STB) or other gateway device may provide local client devices connectivity to the ABR server in addition to providing QAM-based cable channels to a television or other local display device. However, when a local client device (e.g., a mobile phone, or personal or tablet computer) connected to the STB requests an AV stream, the stream is requested directly from the CDN/ABR server, and the STB is used only as a data access device. The local client device may be aware of network conditions between itself and the STB, but may not be directly aware of network conditions between the ABR server and STB. Therefore, selection of a bit rate for receiving the AV stream may be based on indirectly perceived network conditions between the local client and the ABR server. Furthermore, since the STB is just a data access device with respect to the ABR operations, each local client has to fetch the ABR data from the ABR Server end-to-end.

BRIEF DESCRIPTION OF THE DRAWINGS

A detailed description will be made with reference to the accompanying drawings.

DETAILED DESCRIPTION

Figure 1:
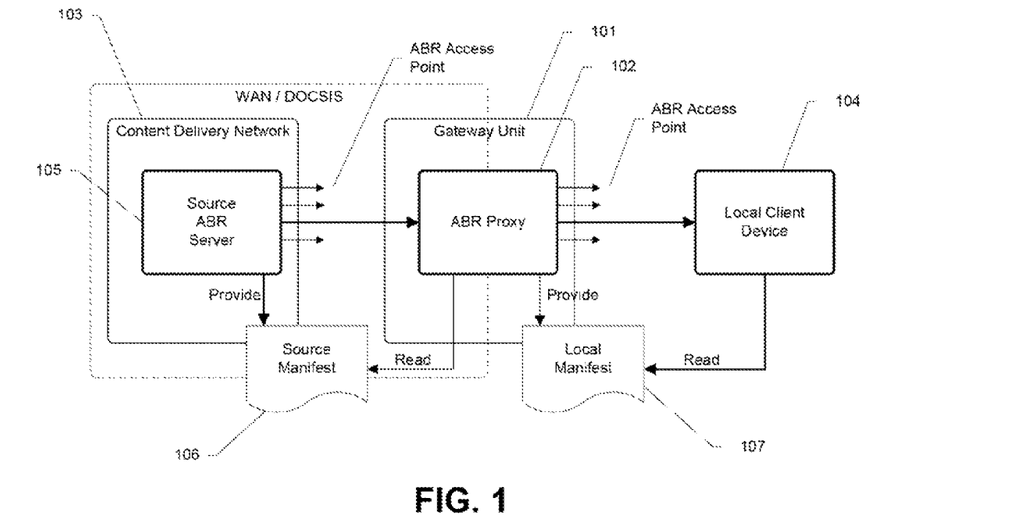
FIG. 1 illustrates a component diagram for an example gateway unit, including an adaptive bit rate (ABR) proxy for providing audio/video (AV) content to local devices.

FIG. 1 illustrates a component diagram for an example gateway unit 101, including an adaptive bit rate (ABR) proxy 102 for providing audio/video (AV) content to local devices in accordance with one or more implementations of the subject technology. Gateway unit 101 is configured to receive AV content items as one or more AV streams (or "IP streams") from a content delivery network (CDN) 103, and to provide the AV content items to local devices by way of optimal user-quality ABR-based streaming. AV content items include, for example, digital television programs, movies, or generally any multimedia content capable of being delivered over a digital network via one or more AV streams.

In one or more implementations, gateway unit 101 may be configured as a (cable television) set-top-box that receives, processes, and distributes television signals to a non-IP enabled viewing device (e.g., a television). Gateway unit 101 may be implemented as, or include, a computing device (e.g., desktop, server, laptop, notebook, tablet computer) or other device connected to a network (e.g., a LAN, WAN, or the Internet) and configured to receive AV streams from an external source. In some aspects, gateway unit 101 may include a tuner for receiving traditional digital content (e.g., over QAM).

ABR proxy 102 (e.g., embedded within gateway unit 101) acts as an intermediary for requests from one or more local IP-enabled client devices 104 seeking AV content items from a source ABR server 105 or other video servers in CDN 103. A local client device 104 may include, for example, a desktop, laptop, notebook, or tablet computer, smart phone, PDA, a television or other display device having a computer embedded within or attached thereto, or the like. Local client device 104 may be connected to gateway unit 101 via WiFi, Ethernet, Bluetooth, radio frequency, coaxial cable, fiber optic, twisted pair, or other IP-based network infrastructure.

CDN 103 may be part of a cable TV system having a network infrastructure that utilizes Data Over Cable Service Interface Specification (DOCSIS) to provide high-speed data transfer to gateway unit 101 and other remotely connected devices. CDN 103 includes (remote) source ABR server 105 or other multimedia server operably connected to gateway unit 101 over a LAN, WAN, or the Internet. Source ABR server 105 may receive AV content items (e.g., in a live television feed), for example, from a content source and, in one or more implementations, provide the AV content items as streaming media over HTTP.

Source ABR server 105 may encode the AV content items into one or more AV streams. An AV stream may be segmented into small multi-second AV content segments (e.g., between two (2) and ten (10) seconds in length). In this manner, each AV segment is made available by source ABR server 105 in multiple AV representations (e.g., stream profiles), with each AV representation for providing the segment at one or more different data rates (e.g., bit rates) and/or in one or more different formats (e.g., picture sizes, frame rates, and the like). Source ABR server 105 advertises the available AV representations by way of a source manifest file 106. For example, source manifest file 106 may advertise one or more source AV representations for each available AV content item, in addition to a master playlist that describes the AV content segments (e.g., the order and length of the AV content segments as well as segment attributes such as data rate) available from source ABR server 105.

ABR proxy 102 acts as an ABR client for the purpose of receiving a segmented source AV stream from source ABR server 105, and acts as a local ABR server for the purpose of delivering the content of the stream to a local client device 104, connected to gateway unit 101. Accordingly, ABR proxy 102 receives the source AV stream in a source AV representation (e.g., CODEC, bit rate, picture size, and the like) provided by source ABR server 105, and advertises the content of the stream to client devices in one or more local AV representations determined by ABR proxy 102.

When local client device 104 requests to view an AV content item, ABR client 102 operably connects to ABR proxy 102 and identifies local AV representations advertised by ABR proxy 102 for the AV content item, for example, by downloading and reading local manifest file 107. ABR proxy 102 then selects a source AV representation for receiving one or more AV content segments of a source AV stream for the AV content item from ABR server 105.

In one or more implementations, ABR proxy 102 selects an advertised source AV representation for an AV content item (provided by source ABR server 105) based on one or more network conditions. For example, ABR proxy 102 may select an AV representation having the highest advertised data rate available over the existing DOCSIS infrastructure and, if data-traffic congestion (or other negative network condition) between ABR proxy 102 and source ABR server 105 is detected, ABR proxy 102 may select a new AV representation (advertised by manifest file 106) having a lower bit rate. In one or more implementations, ABR proxy 102 may be limited in the picture size and frame rate that it is able to transcode. Accordingly, ABR proxy 102 may limit what AV representations it requests from source ABR server 105 to those AV representations that do not exceed the transcoding capability of ABR proxy 102, such as frame size, frame rate or data rate.

ABR proxy 102 may receive the source AV stream from source ABR server 105 according to one or more selected source AV representations, and generates (e.g., transcodes), based on the selected source AV representation(s) and/or network conditions, one or more local AV representations for transmitting AV content segments of the received source AV stream to client devices. In this regard, ABR proxy 102 functions as an ABR server to advertise a local stream in one or more available AV representations by way of a local manifest file 107. Data rates for the local AV representations may be limited by the data rate of the currently received source AV stream and the ability of the proxy's transcoder to transcode the source AV stream. For example, ABR proxy 102 may be able to produce any of a wide variety of picture sizes, frame rates and bit rates that are less than or equal to the corresponding attributes of the source AV stream. However, ABR proxy 102 may be limited in the number of representations it can generate (e.g., via transcoding) for each AV segment.

Network conditions that may influence selection of a source AV representation may include available or predicted throughput, bandwidth, latency, signal strength, and the like between the ABR server 105 and ABR proxy 102, or between ABR proxy 102 and local client device 104. For example, ABR proxy 102 may measure how long it takes to receive an AV segment, and based on that measurement determine which AV representation it should request for future segments from ABR server 105. Local client device 104 may select local AV representations in the same manner. However, ABR proxy 102 may provide only local AV representations supported by the selected source AV representation.

In one or more aspects, ABR proxy 102 may be further configured to determine what types of client network interfaces are offered by or in communication with gateway unit 101, and provide one or more AV representations for each client network interface based on the capabilities of the interface. In this regard, ABR proxy 102 may provide a local manifest file 107 to each type of client network interface, with each manifest file advertising AV representations that are suitable for each different client network interface. In one or more implementations, local client device 104 may communicate its network capabilities through Universal Plug and Play (UPnP) discovery mechanisms between the device and gateway unit 101, and the AV representations generated by ABR proxy 102, or selected by local client device 104, may be generated or selected based on those capabilities. ABR proxy 102 may also measure channel conditions (e.g., throughput, signal strength, latency, bandwidth) for a local client network interface and change the AV representations that are advertised based on those conditions.

Using the subject technology, local client device 104 may read local manifest file 107 provided by ABR proxy 102, and request to receive an local AV stream according to one of multiple locally advertised AV representations. Accordingly, ABR proxy 102 provides the local AV stream to local client device 104 according to the requested AV representation. Local client device 104 may then select a new AV representation advertised by ABR proxy 102 as network conditions change between local client device 104 and ABR proxy 102. Likewise ABR proxy 102 may select a new AV representation for receiving the source AV stream from ABR server 105 as network conditions change between ABR proxy 102 and ABR server 105.

For example, local client device 104 may request AV content segments at the lowest data rate advertised by ABR proxy 102. If local client device 104 finds the download speed for those AV content segments to be greater than the data rate of the segments downloaded, then it may request AV content segments at the next higher data rate. Similarly, if the client finds the download speed is lower than the bit rate for the AV content segments, it may request AV content segments at the next lower data rate. Similarly, ABR proxy 102 may request source AV content segments from ABR server 105 at lower or higher data rates depending on download speeds from ABR server 105.

Figure 2:
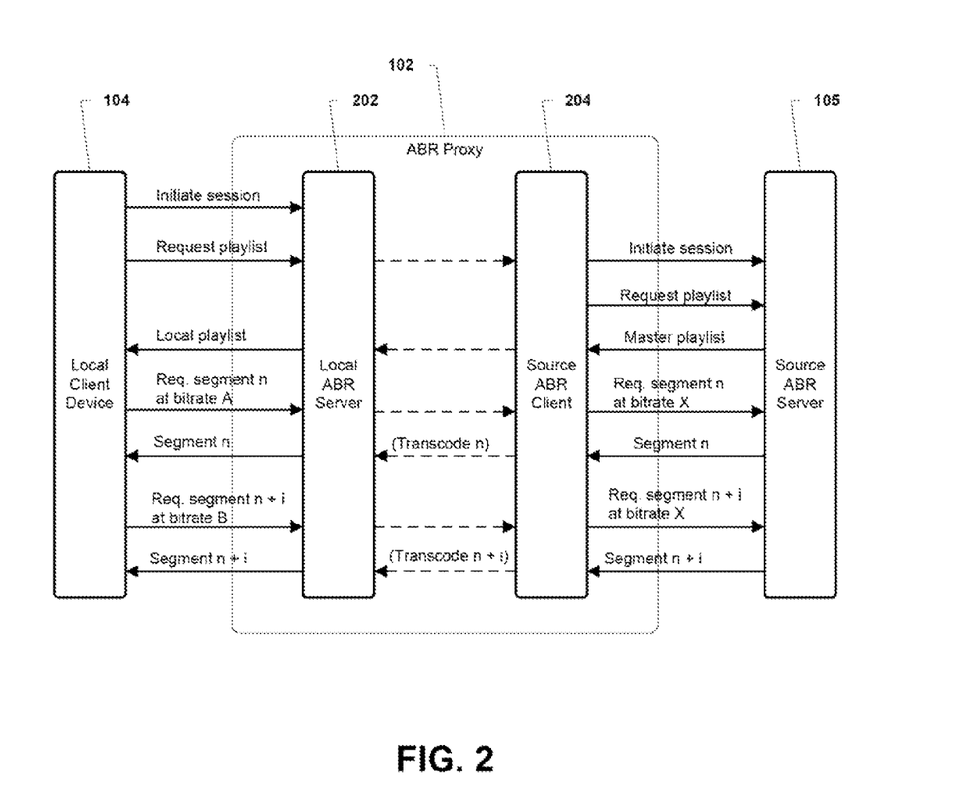
FIG. 2 illustrates an example state diagram for an example ABR proxy that provides AV content segments corresponding to an AV content item.

FIG. 2 illustrates an example state diagram for an example ABR proxy 102 that provides AV content segments corresponding to an AV content item, in accordance with one or more implementations of the subject technology. The AV content item may be provided in a live Internet stream cast, a cable TV feed, or other AV source broadcast and/or distributed, for example, by a content delivery network. ABR proxy 102 retrieves AV content segments corresponding to the AV content item from a source ABR server 105 and provides AV content segments for the AV content item to a local client device 104. ABR proxy 102 selects one of a plurality of source AV representations advertised by source ABR server 105 for receiving one or more AV content segments corresponding to the AV content item from ABR server 105. ABR proxy 102 may then generate local AV representations for transmitting local AV content segments corresponding to the source AV content segments to local client device 104 based on one or more criteria (e.g., network conditions and/or source data rate).

ABR proxy 102 may include a local ABR server component 202 for communication with local client device 104, and a source ABR client component 204 for communication with source ABR server 105. In this regard, ABR proxy 102 may maintain and manage one or more different sessions (e.g., HTTP sessions) for each device and/or proxied communication. ABR proxy 102 may establish one session between local client device 104 and local ABR server component 202, and another session between source ABR client component 204 and ABR server 105. Accordingly, a different session for each connected client device may be established and maintained independently of each other.

With reference to the example of FIG. 2, local client device 104 may initiate a connection request and handshaking procedure with ABR proxy 102 to establish a communication channel between the devices for receiving one or more AV content items, and to set parameters for the channel before communication over the channel begins. As part of this process, a session between the devices may be initiated. Local client device 104 then requests an AV content item and a local manifest file, including a segment playlist for that AV content item.

ABR proxy 102 may initiate a connection request and handshaking procedure with source ABR server 105 for the requested AV content item, and, once established, request a source manifest file, including a master playlist, from source ABR server 105. On receiving the source manifest file, ABR proxy 102 may generate a local manifest file, including a local playlist, based on the source manifest file. For example, the local manifest file may include the same segment length and order as the source manifest file, but identify different AV representations (e.g., data rates, picture sizes, frame rates, resolution, and the like) for local AV content segments. ABR proxy 102 may determine which local AV representations to generate based on current network conditions (e.g., throughput or bandwidth) and/or the data rate at which source AV content segments are received. These segments may be additional AV representations that it generates to account for possibly lower performance of the local network, and/or limited capabilities of the client device(s). In one or more implementations, ABR proxy 102 may make available the exact same segments that it receives from source ABR server 105, to the client. ABR proxy 102 may also determine a segment length for local AV content segments (e.g., if different due to transcoding by gateway unit 101), and then include this information as part of the local manifest file. The local manifest file, including the local playlist, is provided to local client device 104. In one or more implementations, the local playlist and the master playlist may be identical. In the depicted example, local client device 104 sends client HTTP requests with appropriate uniform resource locator (URL) information to local ABR server component 202 to receive corresponding local AV content segments from local ABR server component 202. Each client HTTP request requests transmission of a respective local data segment at a selected one of the local ABR formats provided by the local manifest file (e.g., "bitrate A"). In one or more implementations, local ABR server component 202 in connection with source ABR client component 204, provides a proxy for the requests, and source ABR client component 204 sends corresponding proxy HTTP requests with appropriate uniform resource locator (URL) information to source ABR server 105 to receive corresponding source AV content segments from source ABR server 105. Each proxy HTTP request requests transmission of a respective source data segment at a selected one of the source AV representations provided by the source manifest file (e.g., "bitrate X").

In one or more implementations, ABR proxy 102 does not wait until it receives a request from the client before requesting a segment from the source server. ABR proxy 102 may request AV content segments from source ABR server 105, and then optionally generate different AV representations for local client device 104, and make both the received and generated AV representations available to the client. Local client device 104 requests AV content segments, selecting from what is available from the proxy. ABR proxy 102 may continue to request AV content segments from source ABR server 105 in advance of when the client may request them, so that ABR proxy 102 has both the received and transcoded versions available in time for the client. In this manner, ABR proxy 102 may be a proxy for the whole ABR service, not for individual segments.

ABR proxy 102 receives source AV content segments from source ABR server 105 according to the source data representation and the proxy HTTP requests, optionally converts the received source AV content segments to corresponding local AV content segments, and provides the received source AV content segments and/or the corresponding local AV content segments to the local client device (e.g., according to the received client HrTP requests). In one or more implementations, local client device 104 may request (e.g., via a client HTTP request) a first segment n (e.g., in the local playlist) at bitrate A from local ABR server 202. The request may then be forwarded to source ABR client component 204 which requests (e.g., via a proxy HTTP request) corresponding segment n (e.g., in the master playlist) from source ABR server 105. The segment n is returned from source ABR server 105 to ABR proxy 102, which may transcode the segment and return a corresponding segment n to local client device 104 in response to the request from local client device 104.

Local client device 104 may then request one or more new local AV content segments n+i at bitrate B. Source ABR client component 204 may continue to receive source AV content segments at the current source data rate X until circumstances dictate selection of a different source AV representation. ABR proxy 102 may determine the highest performing AV representation that local client device 104 is ever expected to request (e.g., based on the type of client or network interface), and provide a local manifest file that includes that AV representation, in addition to lower performing AV representations. Local client device 104 may then select AV representations within the local manifest file that are suitable for current network conditions between the client and ABR proxy 102. Source ABR client component 204 may detect data traffic congestion associated with receiving the source AV content segments from source ABR server 105. In response to detecting the data traffic congestion between source ABR client component 204 and source ABR server 105, source ABR client component 204 may select a second source AV representation from the plurality of source AV representations advertised by source ABR server 105 (e.g., via the source manifest file), and begin receiving the source AV content segments from source ABR 105 server according to the selected second source AV representation. Accordingly, local ABR server component 202 may update, based on the second source AV representation, the local AV representations provided to local client device 104. On detecting the updated local manifest file, local client device 104 may send a request to receive local AV content segments according to a selected one of the updated local AV representations. Local ABR server component 202 may then provide local AV content segments to local client device 104 according to the selected one of the updated local AV representations.

Figure 3:
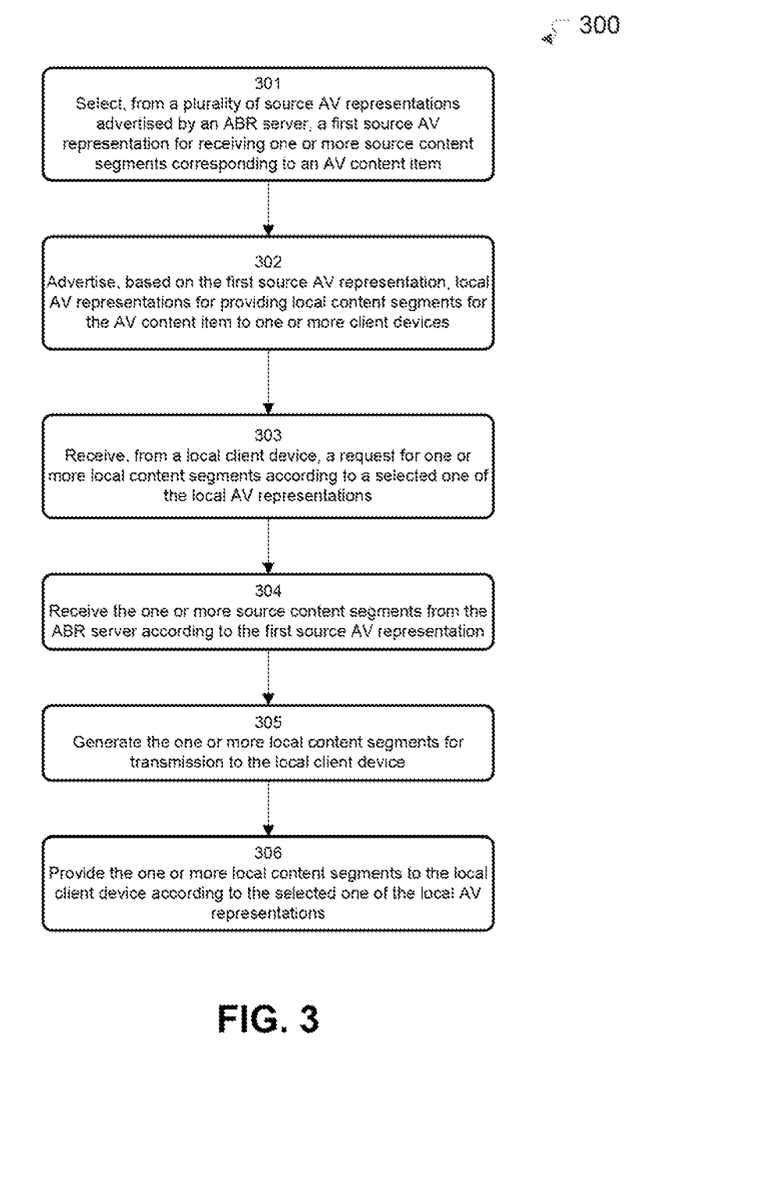
FIG. 3 is a flowchart illustrating an example process for providing proxied ABR streaming to local devices.

FIG. 3 is a flowchart illustrating an example process 300 for providing proxied ABR streaming to local devices. The blocks of FIG. 3 do not need to be performed in the order shown. It is understood that the depicted order is an illustration of one or more example approaches, and are not meant to be limited to the specific order or hierarchy presented. The blocks may be rearranged, and/or or more of the blocks may be performed simultaneously.

According to one or more implementations, one or more blocks of FIG. 3 may be executed by gateway unit 101 or other computing device of the subject technology. Similarly, a non-transitory machine-readable medium may include machine-executable instructions thereon that, when executed by a computer or machine, perform the blocks of FIG. 3. Accordingly, the blocks of FIG. 3 may be performed within the context of providing an AV stream associated with an AV content item to a client device (e.g., a desktop, laptop, notebook, or tablet computer, smart phone, PDA, a television or other display device having a computer embedded within or attached thereto, or the like).

According to FIG. 3, a first source AV representation for receiving one or more source AV content segments corresponding to an AV content item is selected from a plurality of source AV representations advertised by a source ABR server (301). The source AV representations may include, for example, data rates for the AV content segments, a resolution of the rendered AV content segments, or the like provided by source ABR server 105 in a source manifest file 106. Selection of the first AV representation may include, for example, a determination (e.g., by ABR proxy 102) that the first AV representation is the best AV representation available from the source ABR server under current network conditions. The first source AV representation may be selected from source manifest file 106 based on one or more first network conditions relating to receiving the source AV content segments from the ABR server.

Local AV representations for providing local AV content segments for the AV content item are advertised to one or more client devices (302) by gateway unit 101. The local AV representations are generated and provided to a local client device 104 by way of a local manifest file 107. In one or more aspects, the local AV representations may be determined based on the first source AV representation. For example, the local AV representations may be limited by the current bandwidth between the gateway unit 101 and source ABR server 105. In this regard, the bandwidth for local AV content segments provided to local client devices may not exceed the bandwidth at which the source AV content segments are received.

In other aspects, the local AV representations may be generated based on the client network interface for the local client device. As described previously, the client network interface of the operably connected local client device may be determined by ABR proxy 102 (including, e.g., gateway unit 101) by UPnP (e.g., DLNA), and, the local manifest file 107 may be generated to provide AV content segments in one or more AV representations (e.g., at a data rate) appropriate for the interface. Moreover, network channel conditions (e.g., predicted or current bandwidth, latency, signal strength, and the like) for the client network interface may be determined, and the local AV representations generated based on the channel conditions. Accordingly, ABR proxy 102 may be configured to monitor the network conditions, and, determine a change in one or more network channel conditions. On a change in one or more network channel conditions, the local AV representations (and local manifest file) may be updated based on the change. For example, a new set of AV representations may be generated that include data rates appropriate for current network channel conditions.

With continued reference to FIG. 3, a request for one or more local AV content segments according to a selected one of the generated local AV representations is received from a local client device (303). In this regard, the first source AV representation may include, for example, a first data rate, and the requested one of the local AV representations may comprise a second data rate, with the second data rate being different than the first data rate. The request may include, for example, a request for a local manifest file 107 corresponding to the AV content item, and/or one or more subsequent HTTP requests for local AV content segments corresponding to web addresses (e.g., URLs) provided by the local manifest file.

One or more source AV content segments are received from the ABR server according to the first source AV representation(s) (304). Accordingly, ABR proxy 102 may request a source manifest file 106 for the AV content item, and/or initiate one or more subsequent HTTP requests for the AV content segments corresponding to web addresses (URLs) provided by the source manifest file.

One or more local AV content segments are generated for transmission to the local client device (305). In one or more implementations, the source AV content segments are transcoded to one or more new local AV representations for delivery to one or more client devices. Accordingly, ABR proxy 102 may change the data rate, picture size, and/or frame rate of the segments which are generated and made available to a local client device 104. In one or more implementations, one or more source AV content segments may be passed through unchanged (e.g., a local content segment may be a source content segment).

The one or more local AV content segments are provided to the local client device according to the selected one(s) of the local AV representations (306). In this regard, gateway unit 101 may receive one or more client HTTP requests from the local client device, with each client HTTP request being for a respective local content segment at one of the generated local AV representations. In some implementations, for each received client HTTP request, ABR proxy 102 (e.g., via source ABR client component 204) may send a proxy HTTP request to source ABR server 105 for a corresponding source content segment, and the received source AV content segments may be received from source ABR server 105 according to the proxy HTTP requests, with the local AV content segments being provided to the local client device according to the received client HTTP requests. As described previously, each of the local AV content segments may be provided to the local client device according to the client's selection of the segments from a local playlist for the AV content item, with the local playlist being based on a master playlist provided by source ABR server 105.

Figure 4:
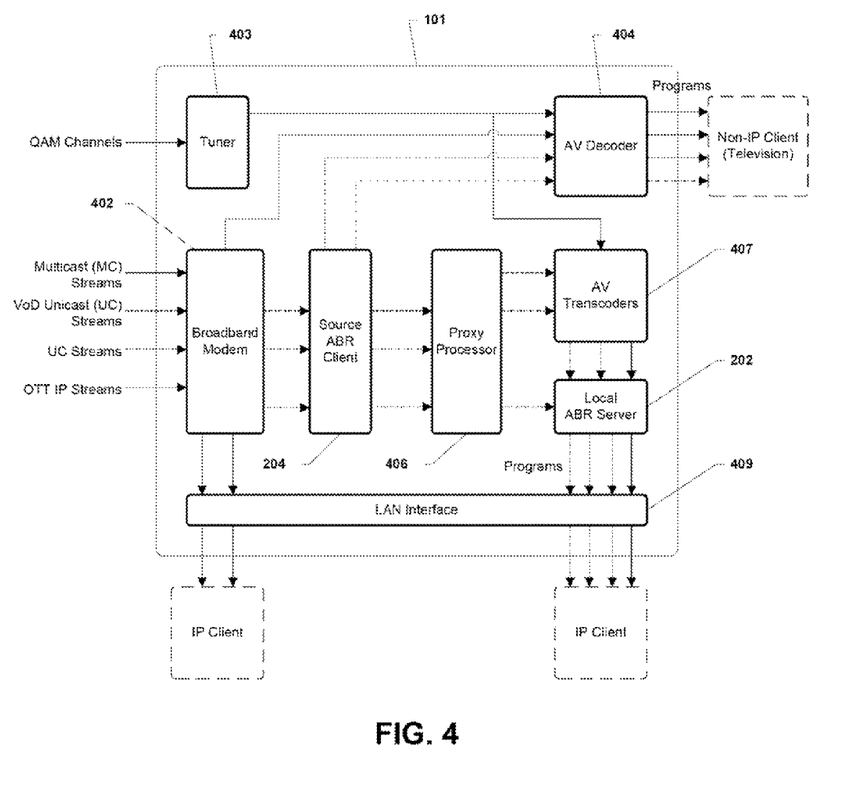
FIG. 4 is a diagram illustrating an example set-top unit for providing proxied ABR streaming to local devices.

FIG. 4 is a diagram illustrating an example gateway unit 101 for providing proxied ABR streaming to local devices, in accordance with one or more implementations of the subject technology. Gateway unit 101 includes a broadband modem 402 (e.g., a cable modem), a multi-tuner 403 (e.g., a QAM (quadrature amplitude modulation) tuner or ATSC (Advanced Television Systems Committee) tuner), an AV decoder 404, a source ABR client component 204, an proxy processor 406, one or more AV transcoders 407, an embedded local ABR server 202, and one or more local area network (LAN) interfaces 409.

Digital channels may be received via QAM by tuner 403 and then modified forwarded to one or more non-IP client devices (e.g., a television or other display device). Content items may be compressed or transcoded before being forwarded to the client devices. In one or more implementations, content may be received and then decoded by AV decoder 404 before being forwarded to a client device. In this regard, the output of AV decoder 404 may go to a directly attached TV, via a suitable display interface, such as HDMI, Display Port or analog video.

Additionally or in the alternative, to support multiple client devices, QAM channels received at tuner 403 may be transcoded by transcoders 407 and converted to IP streams, and then streamed via the LAN interfaces 409. LAN interfaces 409 may include, for example, one or more 802.3 (Ethernet) interfaces, MoCA, one or more 802.11 (wireless) interfaces, or the like. Gateway unit 101 is further configured to enable operably connected local IP clients to directly stream video from a CDN as over-the-top (OTT) content (e.g., unicast or multi-cast). Accordingly, gateway unit 101 provides a data pipe for the local IP clients.

Gateway unit 101 is configured to support video-on-demand (VoD) and other IP streaming. In this regard, broadband modem 402 is configured to receive unicast and multicast IP streams and pass them to decoder 404 or to one or more LAN interfaces 409 for direct streaming to one or more IP client devices. Broadband modem 402 may act as a data pipe for source ABR client component 204, which selects an appropriate data rate for receiving a stream based on network conditions. For example, broadband modem 402 may receive VoD content (e.g., as a unicast stream) and pass the content to source ABR client component 204. Source ABR client component 204 may then pass the VoD content to decoder 404 for viewing on a local client device. In one or more aspects, source ABR client component 204 may pass the VoD content (or other IP content) through to a LAN interface 409 for direct streaming (e.g., via unicast) to an IP client device, without any assistance from source ABR client component 204 (e.g, with the IP client device acting as an ABR client).

In the depicted example, source ABR client component 204, proxy processor 406, AV transcoders 407, and local ABR server 202 make up the previously described ABR proxy components of FIGS. 1 and 2. Accordingly, gateway unit 101 is configured to operate as a local ABR server for operably connected IP client devices, and as an ABR client for interaction with a remote source ABR server. The local ABR server 202 works in connection with the local IP client devices to achieve an optimal user quality-of-experience based on the network conditions of the LAN interfaces. Likewise, source ABR client component 204 works in connection with the source ABR server to achieve an optimal user quality-of-experience based on the conditions of the WAN interface (e.g., DOCSIS). AV transcoders 407 optionally adapt received source content by converting the content to provide certain characteristics appropriate for the local client device and/or local network, for example, picture size, frame rate, bit rate, and the like. Proxy processor 406 operates to provide optimal matching between the LAN and WAN in terms of achievable quality-of-experience for the connected local client devices, making use of transcoders 407 when appropriate. Using the subject technology, the number of streams that are required to be available in the network (CDN) video server can be reduced, since the previously described ABR proxy components of gateway unit 101 operate together to provide a fine-tuned data rate adaptation for the AV content items consumed by the operably connected client devices.

Figure 5:
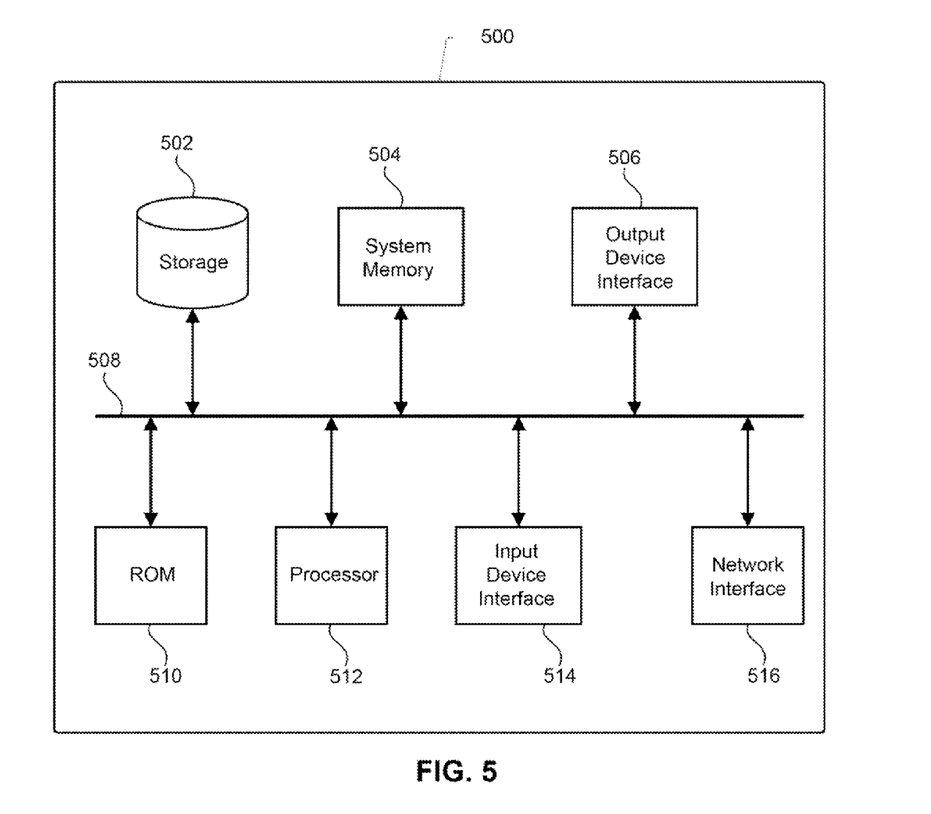
FIG. 5 is a diagram illustrating an example electronic system for use in connection with providing proxied ABR streaming to local devices, including a processor and other internal components.

FIG. 5 is a diagram illustrating an example electronic system 500 for use in connection with providing proxied ABR streaming to local devices, including a processor and other internal components, in accordance with one or more implementations of the subject technology. Electronic system 500, for example, is representative of the computing hardware embedded within, or for providing functional operation of, the previously described devices, including gateway unit 101, local client device 104, and the like. In one or more aspects, electronic system 500 may be a desktop computer, a laptop computer, a tablet computer, a server, a switch, a router, a base station, a receiver, a phone, a personal digital assistant (PDA), or generally any electronic device that transmits signals over a network. Such an electronic system includes various types of computer readable media and interfaces for various other types of computer readable media. Electronic system 500 includes bus 508, processing unit(s) 512, system memory 504, read-only memory (ROM) 510, permanent storage device 502, input device interface 514, output device interface 506, and network interface 516, or subsets and variations thereof.

Bus 508 collectively represents all system, peripheral, and chipset buses that communicatively connect the numerous internal devices of electronic system 500. In one or more implementations, bus 508 communicatively connects processing unit(s) 512 with ROM 510, system memory 504, and permanent storage device 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. One or more implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores any of the instructions and data that processing unit(s) 512 needs at runtime. In one or more implementations, the processes of the subject disclosure are stored in system memory 504, permanent storage device 502, and/or ROM 510. From these various memory units, processing unit(s) 512 retrieves instructions to execute and data to process in order to execute the processes of one or more implementations.

Bus 508 also connects to input and output device interfaces 514 and 506. Input device interface 514 enables a user to communicate information and select commands to the electronic system. Input devices used with input device interface 514 include, for example, alphanumeric keyboards and pointing devices (also called "cursor control devices"). Output device interface 506 enables, for example, the display of images generated by electronic system 500. Output devices used with output device interface 506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to a user or device can be any form of sensory feedback, such as visual feedback, auditory feedback, or tactile feedback; and input from the user or device can be received in any form, including acoustic, speech, or tactile input.

As shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. It is understood that electronic system 500 may include multiple network interfaces 516, for example, for connecting electronic system 500 to both a LAN and WAN. Any or all components of electronic system 500 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for providing adaptive bit rate (ABR) streaming to local devices, comprising:
    selecting, by an ABR proxy device, a first source audio/video (AV) representation from among a plurality of source AV representations, the plurality of source AV representations being advertised by an ABR server to the ABR proxy device;
    receiving, by the ABR proxy device from the ABR server, a plurality of source content segments of an AV content item, the plurality of source content segments being associated with the first source AV representation, each of the plurality of source content segments comprising a different portion of the AV content item, and each source content segment of the plurality of source content segments being received by the ABR proxy device responsive to a respective request from the ABR proxy device to the ABR server;
    advertising, by the ABR proxy device and based on the first source AV representation, local AV representations of the AV content item to one or more client devices;
    receiving, by the ABR proxy device and from a local client device, a request for one or more local content segments according to a selected one of the local AV representations; and
    providing, by the ABR proxy device, the one or more local content segments to the local client device according to the selected one of the local AV representations, each of the one or more local content segments comprising a corresponding source content segment of the plurality of source content segments or being transcoded from a corresponding source content segment of the plurality of source content segments.

2. The method of claim 1, further comprising:
    generating the one or more local content segments for transmission to the local client device, wherein the first source AV representation comprises a first data rate and the selected one of the local AV representations comprises a second data rate, the second data rate being different than the first data rate.

3. The method of claim 2, wherein one of the local AV presentations is an equivalent of the first source AV representation.

4. The method of claim 2, wherein the first source AV representation is selected based on one or more network conditions related to receiving the source content segments from the ABR server by the ABR proxy device.

5. The method of claim 1, further comprising:
    receiving one or more client Hypertext Transfer Protocol (HTTP) requests from the local client device, each client HTTP request being for a respective local content segment according to one of the local AV representations; and
    for the one or more client HTTP requests, sending respective proxy HTTP requests to the ABR server for corresponding source content segments,
    wherein the one or more local content segments are provided to the local client device according to the one or more client HTTP requests.

6. The method of claim 1, wherein:
    the plurality of source content segments is received from the ABR server according to a master playlist for the AV content item provided by the ABR server to the ABR proxy device; and
    the one or more local content segments are provided to the local client device according to a local playlist, the local playlist being based on the master playlist and the local AV representations.

7. The method of claim 1, further comprising:
    detecting a change in one or more network conditions associated with receiving the plurality of source content segments from the ABR server by the ABR proxy device;
    in response to detecting the change, selecting a second source AV representation from the plurality of source AV representations advertised by the ABR server to the ABR proxy device; and
    receiving at least one source content segment from the ABR server according to the second source AV representation.

8. The method of claim 7, further comprising:
    updating the local AV representations based on the second source AV representation;
    receiving a request from the local client device to receive one or more new local content segments according to an updated local AV representation; and
    providing the one or more new local content segments to the local client device according to the updated local AV representation.

9. The method of claim 1, further comprising:
    determining a network interface of the local client device; and
    determining the local AV representations based on the network interface.

10. The method of claim 1, further comprising:
    determining one or more network conditions associated with a network interface of the local client device; and
    determining the local AV representations based on the one or more network conditions.

11. The method of claim 1, wherein at least some of the plurality of source AV representations advertised by the ABR server are different from at least some of the local AV representations advertised by the ABR proxy device.

12. The method of claim 1, further comprising:
    determining a first set of network conditions between the ABR server and the ABR proxy device; and determining a second set of network conditions between the ABR proxy device and the local client device, wherein the selecting is based on the first and second sets of network conditions.

13. The method of claim 1, further comprising:
receiving a source manifest file from the ABR server, the source manifest file comprising information associated with the plurality of source AV representations,
wherein the advertising comprises providing a local manifest file to the one or more client devices, the local manifest file being derived from the source manifest file.

14. The method of claim 1, wherein the plurality of source AV representations comprises a plurality of AV representations associated with the AV content item, each of the plurality of AV representations comprises a respective plurality of source content segments of the AV content item, and each of the respective plurality of source content segments is associated with a respective portion of the AV content item.

15. The method of claim 14, wherein the selecting the first source AV representation comprises selecting the first source AV representation from among the plurality of AV representations associated with the AV content item.

16. The method of claim 1, wherein providing, by the ABR proxy device, the one or more local content segments to the local client device further comprises providing, by the ABR proxy device, the one or more local content segments to the local client device without forwarding the request from the local client device for the one or more local content segments to the ABR server.

17. The method of claim 1, wherein each respective request from the ABR proxy device to the ABR server is independent of the request for one or more local content segments received by the ABR proxy device from the local client device.

18. A device for providing adaptive bit rate (ABR) streaming to local devices, the device configured to:
select a first source AV representation from a plurality of source audio/video (AV) representations advertised by an ABR server;
receive, from the ABR server, at least a portion of a source AV stream for an AV content item, the source AV stream comprising a plurality of source content segments associated with the first source AV representation, each of the plurality of source content segments being received from the ABR server responsive to each individual request therefor; and
advertise local AV representations of at least a portion of a local AV stream for the AV content item to one or more client devices, the local AV stream being based on the source AV stream, the at least the portion of the local AV stream comprising a plurality of local content segments each of which is a same duration as a corresponding source content segment of the plurality of source content segments.

19. The device of claim 18, the device further being configured to:
receive, from a local client device, a request for one or more of the plurality of local content segments according to a selected one of the local AV representations;
transcode the corresponding one or more of the plurality of source content segments to generate the one or more of the plurality of local content segments; and
provide the one or more of the plurality of local content segments to the local client device according to the selected one of the local AV representations.

20. device of claim 19, the device further being configured to:
receive the plurality of source content segments from the ABR server according to a master playlist for the AV content item provided by the ABR server; and provide the one or more of the plurality of local content segments to the local client device according to a local playlist for the AV content item, the local playlist being based on the master playlist and the local AV representations.

21. The device of claim 20, the device further being configured
receive one or more client Hypertext Transfer Protocol (HTTP) requests from the local client device, each client HTTP request being for a respective local content segment at one of the local AV representations;
for each received client HTTP request, send a proxy HTTP request to the ABR server for a corresponding one of the plurality of source content segments; and
receive the plurality of source content segments from the ABR server according to the proxy HTTP requests.

22. The device of claim 19, the device further being configured to:
detect a change in one or more network conditions associated with receiving the plurality of source content segments from the ABR server;
select, in response to detecting the change in the one or more network conditions, a second source AV representation from the plurality of source AV representations advertised by the ABR server; and
receive at least one source content segment from the ABR server according to the second source AV representation.

23. The device of claim 22, the device further being configured to:
update, based on the second source AV representation, the local AV representations;
receive a request from the local client device to receive a portion of the local AV stream according to a selected one of the updated local AV representations; and
provide a portion of the local AV stream to the local client device according to the selected one of the updated local AV representations.

24. The device of claim 19, the device further being configured to:
determine a network interface of the local client device, wherein the local AV representations are generated based on the network interface.

25. The device of claim 19, the device further being configured to:
determine one or more network conditions associated with a network interface of the local client device; and
determine the local AV representations based on the one or more network conditions associated with the network interface.

26. The device of claim 25, the device further being configured to:
determine a change in the one or more network conditions associated with the network interface; and
updating the local AV representations based on the change in the one or more network conditions associated with the network interface.

27. A computer program product comprising instructions stored in a tangible computer-readable medium, the instructions comprising:
instructions to select a source audio/video (AV) representation advertised by an adaptive bit rate (ABR) server, the source AV representation being associated with an AV content item;
instructions to advertise local AV representations of the AV content item to one or more client devices
instructions to receive, from a local client device, a request for a portion of the AV content item according to a selected local AV representation;
instructions to receive a plurality of source content segments from the ABR server according to the selected source AV representation, the plurality of source content segments being associated with the portion of the AV content item, each source content segment of the plurality of source content segments being received responsive to a respective request transmitted to the ABR server;
instructions to generate one or more local content segments based on the plurality of source content segments; and
instructions to provide the one or more local content segments to the local client device according to the selected local AV representation, each of the one or more local content segments corresponding to a respective one of the plurality of source content segments.

* * * * *